US008121839B2

(12) United States Patent
Srivastava et al.

(10) Patent No.: US 8,121,839 B2
(45) Date of Patent: Feb. 21, 2012

(54) METHOD AND APPARATUS FOR DETECTING UNSOLICITED MULTIMEDIA COMMUNICATIONS

(75) Inventors: Samir Srivastava, Fremont, CA (US); Francois Audet, Santa Clara, CA (US); Vibhu Vivek, Fremont, CA (US)

(73) Assignee: Rockstar Bidco, LP, New York, NY (US)

( * ) Notice: Subject to any disclaimer, the term of this patent is extended or adjusted under 35 U.S.C. 154(b) by 1543 days.

(21) Appl. No.: 11/305,951

(22) Filed: Dec. 19, 2005

(65) Prior Publication Data

US 2007/0150276 A1    Jun. 28, 2007

(51) Int. Cl.
*G06F 17/27* (2006.01)
*G10L 15/00* (2006.01)
*G10L 11/00* (2006.01)

(52) U.S. Cl. ............ 704/250; 704/9; 704/231; 704/270; 370/352; 379/196; 379/67.1

(58) Field of Classification Search .................. 704/246, 704/250
See application file for complete search history.

(56) References Cited

U.S. PATENT DOCUMENTS

| | | | | |
|---|---|---|---|---|
| 5,029,198 | A * | 7/1991 | Walpole et al. | 379/88.23 |
| 5,897,616 | A * | 4/1999 | Kanevsky et al. | 704/246 |
| 6,321,194 | B1 * | 11/2001 | Berestesky | 704/232 |
| 6,697,461 | B1 | 2/2004 | Middleswarth et al. | |
| 6,769,016 | B2 | 7/2004 | Rothwell et al. | |
| 6,882,971 | B2 * | 4/2005 | Craner | 704/246 |
| 6,937,702 | B1 * | 8/2005 | Vacek et al. | 379/88.02 |
| 7,003,466 | B2 * | 2/2006 | Brown et al. | 704/275 |
| 7,058,684 | B1 | 6/2006 | Ueda | |
| 7,079,638 | B1 * | 7/2006 | Beauchamp et al. | 379/196 |
| 7,287,060 | B1 | 10/2007 | McCown et al. | |
| 7,295,660 | B1 * | 11/2007 | Higginbotham et al. | 379/196 |
| 2003/0083078 | A1 | 5/2003 | Allison et al. | |
| 2003/0191969 | A1 | 10/2003 | Katsikas | |
| 2004/0153552 | A1 | 8/2004 | Trossen et al. | |

(Continued)

FOREIGN PATENT DOCUMENTS

EP        1507394 A2        2/2005

(Continued)

OTHER PUBLICATIONS

International Search Report and Written Opinion from corresponding PCT application PCT/CA2007/001140.

(Continued)

*Primary Examiner* — Justin Rider
(74) *Attorney, Agent, or Firm* — Withrow & Terranova, PLLC

(57) ABSTRACT

A service is configured to analyze multimedia communications to determine a likelihood that the communication is unsolicited. For example, the service may inspect e-mail messages, instant messaging messages, facsimile transmissions, voice communications, and video telephony, and analyze these forms of communication to determine whether an intended communication is unsolicited. In connection with voice and video telephony, a voice sample may be obtained from the caller and voice recognition may be performed on the sample to determine an identity of the person or the identity of the voice. The voice sample may also be used to determine the type of voice—i.e. if the voice is live, machine generated, or prerecorded. Where the call is a video telephony call, image recognition may be used to inspect an image of the person. The information obtained from voice recognition, voice type recognition, and image recognition may be used to detect whether the messages if from a known source of unsolicited communications.

10 Claims, 3 Drawing Sheets

U.S. PATENT DOCUMENTS

| | | | |
|---|---|---|---|
| 2004/0172246 A1* | 9/2004 | Kendra | 704/246 |
| 2004/0205135 A1 | 10/2004 | Hallam-Baker | |
| 2005/0259667 A1 | 11/2005 | Vinokurov et al. | |
| 2006/0031306 A1 | 2/2006 | Haverkos | |
| 2006/0053203 A1 | 3/2006 | Mijatovic | |
| 2006/0079255 A1 | 4/2006 | Bantukul et al. | |
| 2006/0105750 A1 | 5/2006 | Zabawskyj et al. | |
| 2006/0135133 A1 | 6/2006 | Cai et al. | |
| 2006/0168035 A1 | 7/2006 | Cai et al. | |
| 2006/0187900 A1* | 8/2006 | Akbar | 370/352 |
| 2007/0133757 A1* | 6/2007 | Girouard et al. | 379/67.1 |
| 2007/0300286 A1 | 12/2007 | Judge | |

FOREIGN PATENT DOCUMENTS

| | | | |
|---|---|---|---|
| EP | 1742452 A1 | 1/2007 | |
| WO | 2004088455 A2 | 10/2004 | |
| WO | 2006103142 A1 | 10/2006 | |

OTHER PUBLICATIONS

D. Schwartz, et al., Proposal for a SPAM for Internet Telephony (SPIT) Prevention Security Model, Kayote Networks, Jun. 1, 2005 (25 pages).

J. Rosenberg, et al., The Session Initiation Protocol (SIP) and Spam, Internet Engineering Task Force (IETF) Internet Draft (ID), draft-ietf-sipping-spam-00, Feb. 13, 2005 (25 pages).

Extended European Search Report for European Application No. 07728853.3 issued Jun. 7, 2010, 10 pages.

Extended European Search Report for European Application No. 10182883.8 issued Jan. 25, 2011, 3 pages.

Niccolini, S., et al., "SIP Extensions for SPIT Identification," Internet Engineering Task Force (IETF) Internet Draft, Feb. 2006, http://tools.ietf.org/html/draft-niccolini-sipping-feedback-spit-01, 14 pages.

Rosenberg, J., "Rejecting Anonymous Requests in the Session Initiation Protocol (SIP)," Internet Engineering Task Force (IETF) Internet Draft, Jun. 2006, http://tools.ietf.org/html/draft-ietf-sip-acr-code-02, 8 pages.

Rosenberg, J., et al., "SIP: Session Initiation Protocol," Internet Engineering Task Force (IETF) Internet Draft, Feb. 27, 2002, http://tools.ietf.org/html/draft-ietf-sip-rfc2543bis-09, 194 pages.

Handley, M., et al., "SIP: Session Initiation Protocol," Internet Engineering Task Force (IETF) Request for Comments (RFC) 2543, Mar. 1999, http://tools.ietf.org/html/rfc2543, 153 pages.

Schulzrinne, H., et al., "RTP Payload for DTMF Digits, Telephony Tones and Telephony Signals," Internet Engineering Task Force (IETF) Request for Comments (RFC) 2833, May 2000, http://tools.ietf.org/html/rfc2833, 31 pages.

Donovan, S., "The SIP INFO Method," Internet Engineering Task Force (IETF) Request for Comments (RFC) 2976, Oct. 2000, http://tools.ietf.org/html/rfc2976, 10 pages.

Rosenberg, J., et al., "SIP Session Initiation Protocol," Internet Engineering Task Force (IETF) Request for Comments (RFC) 3261, Jun. 2002, http://tools.ietf.org/html/rfc3261, 270 pages.

Roach, A.B., "Session Initiation Protocol (SIP)—Specific Event Notification," Internet Engineering Task Force (IETF) Request for Comments (RFC) 3265, Jun. 2002, http://tools.ietf.org/html/rfc3265, 39 pages.

Non-Final Rejection mailed May 8, 2009 issued by the Patent Office during the prosecution of U.S. Appl. No. 11/646,682. 12 pages.

Final Rejection mailed Jan. 4, 2010 issued by the Patent Office during the prosecution of U.S. Appl. No. 11/646,682. 14 pages.

Non-Final Rejection mailed Sep. 7, 2010 issued by the Patent Office during the prosecution of U.S. Appl. No. 11/646,682. 15 pages.

* cited by examiner

METHOD AND APPARATUS FOR DETECTING UNSOLICITED MULTIMEDIA COMMUNICATIONS

BACKGROUND OF THE INVENTION

1. Field of the Invention

The present invention relates to communication networks and, more particularly, to a method and apparatus for detecting unsolicited multimedia communications.

2. Description of the Related Art

Data communication networks may include various routers, switches, bridges, hubs, and other network devices coupled to and configured to pass data to one another. These devices will be referred to herein as "network elements." Data is communicated through the data communication network by passing protocol data units, such as Internet Protocol (IP) packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

As communication networks have proliferated, corporations and individuals have become reliant on the networks for many different types of communication services. One type of common communication service is the ability to transmit e-mail messages on the network. Since transmission of e-mail messages is generally free, fast, and reliable, e-mail has become a very popular way of communicating over a communication network.

Unfortunately, many individuals and corporations determined that e-mail would be a cheap way of advertising particular products, both wanted and unwanted. Accordingly, e-mail has become commonly used to send unsolicited information. Unsolicited e-mail is commonly referred to as SPAM, and may take many forms, although SPAM generally is of a commercial nature and is sent in bulk form to many recipients. The transmission of SPAM on the Internet has increased to such an extent that at one point it was estimated that about 90% of all e-mail traffic on the Internet was SPAM.

Because of the proliferation of SPAM, many e-mail services and network providers are beginning to provide anti-SPAM screening products and services. These products generally filter SPAM at an email server or at the user's personal computer so that the unsolicited e-mail messages do not get grouped together with other legitimate e-mail messages. SPAM filters generally detect SPAM messages by looking at the sender's source address, the subject line of the e-mail message, and other aspects of the e-mail.

Initially, voice communications were carried on a voice network, and data communications such as e-mail were carried on a separate data (Internet Protocol or IP) network. For various reasons, those networks are being consolidated so that voice calls may be made over data networks using a protocol commonly referred to as Voice over IP (VoIP). VoIP uses the Session Initialization Protocol (SIP) or other signaling protocol to establish a voice call on an IP network, and then uses the transport facilities of the IP network to enable the parties to talk in the same manner as would occur if the voice call had been connected over the voice network.

Although VoIP has the potential to reduce the costs associated with making telephone calls, it also potentially presents a new problem. Specifically, the reduction in cost and difficulty of making an Internet based telephone call has provided an opportunity for SPAM to be delivered over Internet Telephony. Thus, Internet telephony may potentially be abused in the future in the same manner that e-mail has been abused on the current networks. Unfortunately for telephone users, Spam over Internet Telephony (SPIT) is likely to be more intrusive than SPAM has been, since SPIT has the potential to cause a telephone to ring at the user's place of business or home in real time. Thus, unlike SPAM which may be ignored, SPIT has the potential to be quite intrusive.

Other forms of SPAM are also being developed. For example, SPAM over Instant Messaging (SPIM), SPAM over Fax (SPAF), have been reported. Additionally, if video telephony becomes prominent, it is possible that that new media may become abused to transmit SPAM video messages. Accordingly, it would be advantageous to provide a system that could filter multiple types of SPAM.

SUMMARY OF THE INVENTION

The present invention overcomes these and other drawbacks by providing a method and apparatus for detecting unsolicited multimedia communications that may have been created using a number of different media. For example, the method and apparatus may be used to detect SPAM, SPIM, SPAF, SPIT, and video SPAM. For SPAM and SPIM, standard filters are used to reduce the number of SPAM and SPIM messages. Content recognition may be performed on the facsimile transmissions and the content may be analyzed based using tables similar to the SPAM and SPIM content analysis tables.

In connection with VoIP calls, a voice sample may be obtained from the caller and voice recognition may be performed on the sample to determine an identity of the person. The voice sample may also be used to determine the type of voice—i.e. if the voice is live, machine generated, or prerecorded. The voice identity and voice type may be used along with information available from the signaling information associated with the call to selectively connect the call to the identified called party or to a multi-media mailbox server. Where the call is connected to a multi-media mailbox server, the content of any message may be extracted and analyzed to determine whether the message is to be considered SPX. Additional voice recognition may be performed in connection with analyzing the content of the message. The multi-media mailbox server may be configured to store voicemail messages, video-mail messages and other types of messages.

Where the call is a video telephony call, a picture of the person placing the call (i.e. a picture of the person at the source) may be transmitted along with the call setup. Where this is present, image recognition may be used to recognize whether the image is associated with a known SPX generator.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
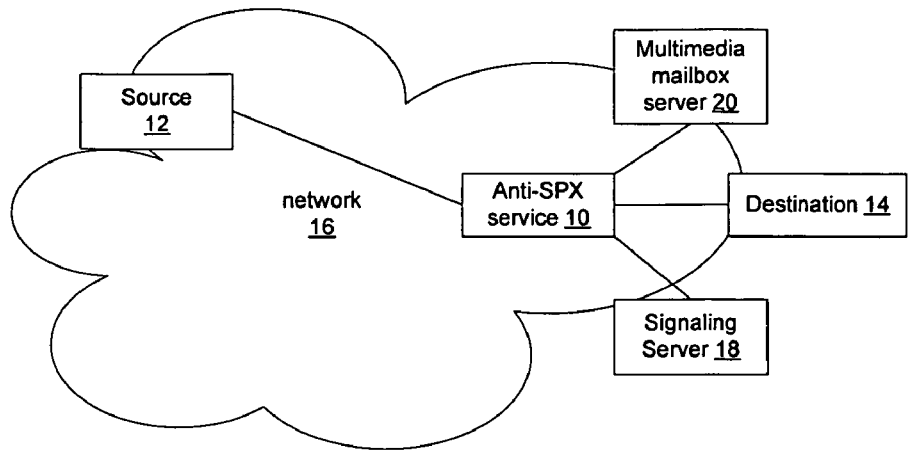
FIG. 1 is a functional block diagram of an example of a network in which anti-SPX services may be deployed to detect unsolicited multimedia communications to reduce unwanted SPX on the network according to an embodiment of the invention.

FIG. 1 shows an example network in which anti-SPX services may be deployed to detect unsolicited multimedia communications to reduce the amount of unwanted SPX that is passed directly to the destination. As used herein, the term "SPX" will be used to refer to SPAM, SPAM over Instant Messaging (SPIM), SPAM over Fax (SPAF), SPAM over Internet Telephony (SPIT), SPAM over Video Telephony (SPOV), and other types of unsolicited multimedia communications. Multimedia, as used herein, will be used to refer to multiple types of media, any one or more of which may be used to generate unwanted SPX. Thus, one media may be e-mail, another media may be instant messaging, another media may be VoIP, etc. Thus, although the term "Multimedia" generally refers to a production such as a movie that is made using multiple types of media, the term "Multimedia" in this application is being used differently to refer to a service that is able to detect unsolicited content that may have been produced using any one or more of a number of different available medias. A device that is capable of multimedia detection, therefore, is a device that can detect unsolicited content generated using multiple types of media, although any one particular message may be produced using only one or more of the available media. For example, a multimedia detection device may be able to scan VoIP traffic, e-mail traffic, and instant messaging traffic. The invention is not limited to this particular example, however, as the multimedia detection device may be configured to scan different combinations of types of traffic depending on the particular application for which it is designed.

Anti-SPX services may be used in multiple environments. FIG. 1 illustrates a generic example in which an anti-SPX service 10 is deployed intermediate a SPX source 12 and a SPX destination 14 on a communication network 16. The anti-SPX service 10 may be operated on a network element such as a router forming part of the network 16, may be operated in connection with a gateway between different administrative portions of the network 16, or may be operated in connection with other services to be provided on the network 16. For example, the anti-SPX service may be operated in connection with a signaling server 18 and/or a multi-media mailbox server 20. The invention is not limited to the particular environment in which the anti-SPX service 10 is configured to operate.

When a message is to be passed from the SPX source 12 to the SPX destination 14, the anti-SPX service 10 will receive the message or a copy of the message and attempt to determine if the message is SPX. For example, in connection with an e-mail message, the anti-SPX service 10 will perform standard SPAM detection processes to determine if the e-mail message is SPAM. Similarly, in connection with instant messaging messages, the anti-SPX service 10 will perform standard SPIM detection processes to determine if the instant message is SPIM. Since SPAM and SPIM detection processes are well known, additional details will not be provided with respect to these aspects of the anti-SPX service 10.

Figure 2:
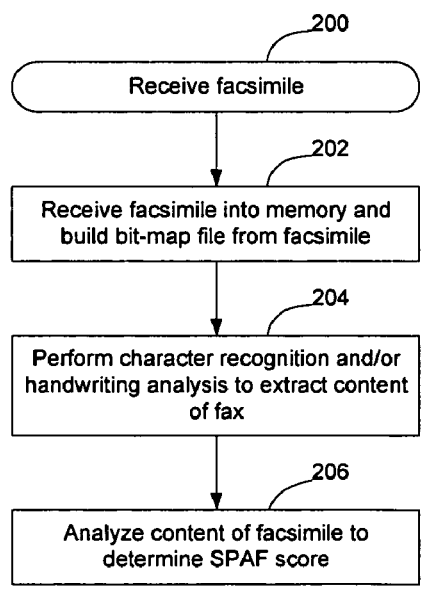
FIG. 2 is a flow chart illustrating an example process of analyzing a facsimile transmission to determine if it is unsolicited.

FIG. 2 illustrates a process that may be used by the anti-SPX service 10 in connection with detecting whether a facsimile is SPAF. As shown in FIG. 2, when the anti-SPX service 10 receives a fax 200, it will receive the fax 200 into memory to build a bit-map file of the fax (202). Character recognition and/or handwriting recognition may be performed to extract the content from the fax (204). For example, optical character recognition software generally converts optical characters into bitmap files and then compares the bitmap files against known bitmaps associated with characters to identify the particular characters that are shown in the file. A similar process may be used once a bitmap of the facsimile has been created so that character recognition may be used to determine the content of the facsimile. Similarly, handwriting analysis may be used to determine the content of hand-written material contained in the facsimile.

Once the content of the facsimile has been extracted, the content of the facsimile may be analyzed to determine if the facsimile is likely to be SPAF. The content analysis of the facsimile may be similar to the content analysis that is commonly performed in connection with e-mail transmissions and instant messaging transmissions. For example, the content may be analyzed to determine the identity of the sender, which is likely to be in the header or in a "from" line, of the facsimile. Also, the content may be analyzed to detect the prevalence of key words that are commonly used to advertise particular goods or are identified as being likely to be prevalent in SPAF transmissions. Other content analysis techniques may be used as well and the invention is not limited to the particular manner in which the content is analyzed once it is extracted from the fax.

Although an embodiment in which store and forward processing has been used to determine whether a facsimile is SPAF, the invention is not limited in this regard, as content analysis may also be performed for real-time facsimile transmissions. Thus, the invention is not limited to the particular way in which the facsimile transmission is established on the network. Accordingly, the underlying facsimile session may be established using any facsimile protocol such as protocols designed to support group 2/3/4 facsimile machines on the legacy voice network, T.38 which is designed to support Fax over Internet Protocol (FoIP), or other types of facsimile protocols.

As a result of the content analysis, the anti-SPX service will generate a SPAF score (206) that may be used to determine whether the facsimile is likely to be SPAF or likely to be a legitimate facsimile. The facsimile may then be transmitted to the destination 14 or an alternate way of communicating the availability of the facsimile may be used to notify the destination 14. Optionally the SPAF score may be communicated to the destination to enable the destination to determine whether they would like to receive the facsimile. For example, the facsimile may be stored temporarily (e.g. in the multimedia mailbox server) and an e-mail notification may be sent to the destination. The invention is not limited to the particular manner in which the facsimile is handled after detecting the possibility that a particular facsimile is likely to be SPAF.

Figure 3:
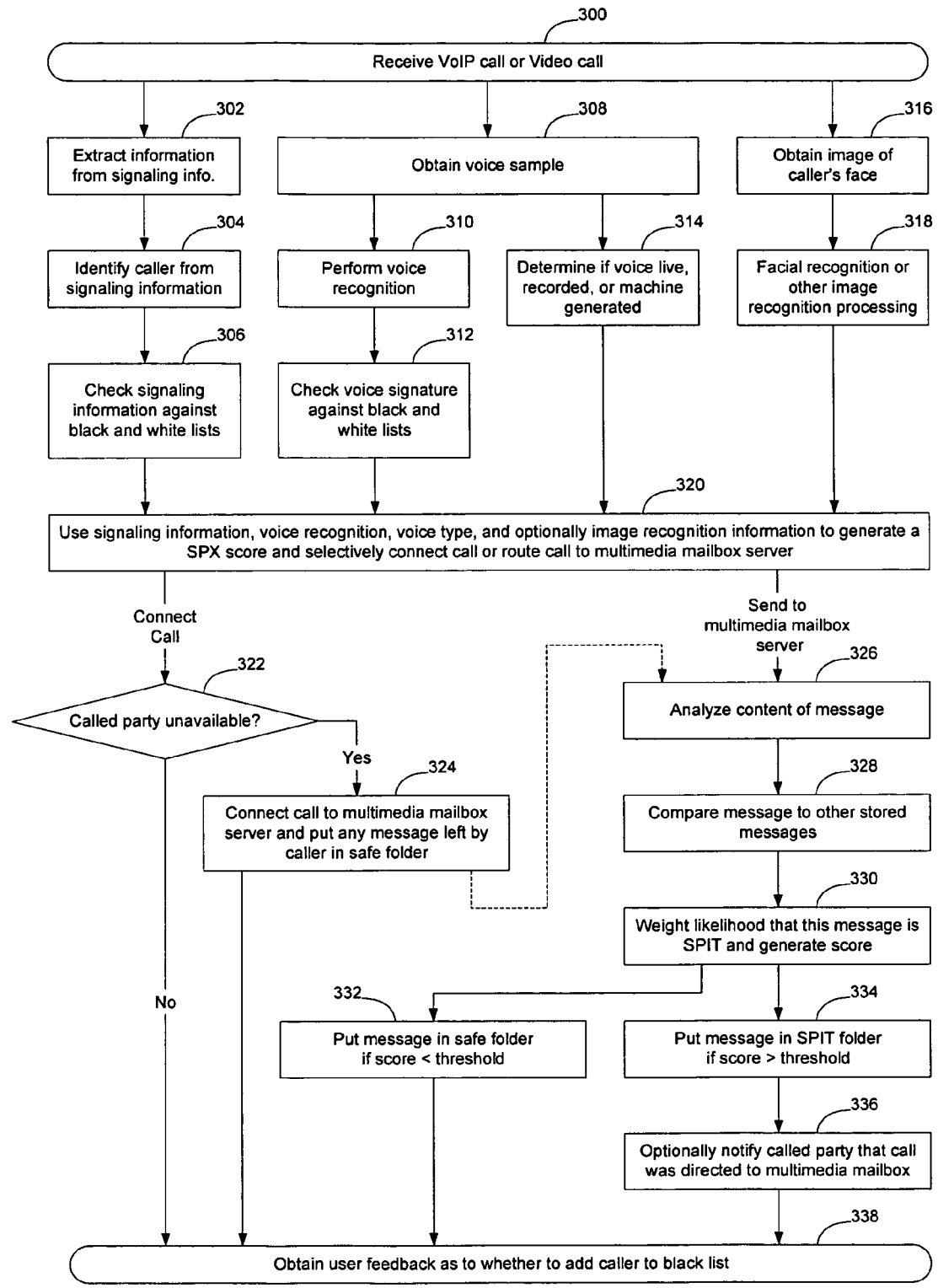
FIG. 3 is a flow chart illustrating an example process of analyzing voice and video telephony transmissions to determine if they are unsolicited.

FIG. 3 illustrates a process that may be used by the anti-SPX service 10 in connection with detecting whether a voice call, such as a VoIP call or video call, is likely to be SPX. Since both voice and video calls are likely to include an audible component, similar audio processing may be performed on each of these types of calls. In connection with a video call, the anti-SPX service may additionally provide image recognition on the video portion of the call. Hence, because of the common audio aspect, these two types of call processing have been described commonly in FIG. 3. It should be recognized, however, that not all of the processes illustrated in FIG. 3 will apply to calls that don't include video content.

In the embodiment shown in FIG. 3, when a voice or video call is received (300) the anti-SPX service will extract signaling information (302) and attempt to identify the caller from the signaling information (304). Examples of signaling information include information available from the Session Initialization Protocol SIP), H.323, Media Gateway Control Protocol (MGCP), or proprietary protocols. Signaling protocols continue to evolve and new protocols are being developed and the invention is not limited to the use of signaling information from currently implemented protocols as aspects of the invention are likely to be useable in connection with other to be developed protocols.

Whatever form of signaling information is available may then be checked against black and/or white lists (306) in a conventional manner to determine if the source 12 is black and/or white listed. Where signaling information is not available, for example where caller ID information has been blocked, the fact that the signaling information has been blocked may be used by the anti-SPX service as an indication that the call is likely a SPX call. Similarly, if the same caller has made many phone calls within a given period of time, it may be that the call is more likely to be a SPIT call. Hence, if a caller is making many phone calls it may be that the caller is more likely to be a SPIT generator.

The signaling information may also be checked to determine if the call is a conference call. Generally, the signaling information will contain an indication as to whether the call is a conference call and, accordingly, should be connected to multiple destinations. Where the same media is being sent to multiple destinations and the signaling information does not indicate that the call is a conference call, the non conference calls may be treated as SPIT. Similarly, where the same source is attempting to connect to multiple destinations serially, and is repeating the same media stream or similar media streams in connection with each destination, calls from the source may be treated as SPIT unless the source is on a white list. For example, a hospital that is on a white list will be able to make text to speech generated calls to multiple patients without having the calls screened as SPIT. The signaling information may be used in other ways to help determine which calls are SPIT and which are legitimate, and the invention is not limited to these particular examples.

The anti-SPX service 10 may also attempt to obtain a voice sample associated with the call (308) so that voice identification may be performed, and/or voice type identification may be performed. With a voice call, since the voice information doesn't exist until the call is placed to the end user, filtering of voice/video calls based on voice identification may not occur unless a sample is obtained during the connection process. This may be obtained, for example, by causing the call to be temporarily placed in an off-hook condition artificially to cause a connection to be established. The caller may then be prompted to speak their name, a particular phrase, or answer a question, so that a voice sample may be obtained. Other ways of obtaining a voice sample from the source 12 may be used as well and the invention is not limited to the particular manner in which a voice sample is obtained. Where the user refuses to speak, the lack of a voice sample may be used in connection with determining if the call is likely to be SPX.

If a voice sample is obtained from the source 12, a voice recognition process may be performed 310 to obtain a voice signature that may be used to identify the voice or identify a person associated with the source. The voice signature determined from the voice recognition process may be used to check against black and/or white lists of voice signatures known to the anti-SPX service (312) to determine if the source is a known source of SPX or known to the users of the service as not likely to be a source of SPX. Optionally, where the voice sample was obtained by asking the source to answer a question, the content of the voice sample may be extracted using a speech recognition process and the content analyzed to determine if the response is an anticipated response. Where the response is not anticipated, this fact may be taken in to account when determining if the call is likely to be SPX.

The type of voice may also be determined. Specifically, the anti-SPX service may determine if the voice is associated with a live person, is part of a pre-recorded message, or is machine generated (314). A pre-recorded voice or a machine-generated voice is much more likely to be associated with SPX because it is much less costly to transmit 1000 prerecorded or machine generated messages than it is to have a live person deliver the same message 1000 times. Accordingly, the type of voice may be used by the anti-SPX service in connection with determining if the call is likely to be SPX.

Where the call is a video telephony call, a picture of the person placing the call (i.e. a picture of the person at the source) may be transmitted along with the call setup. Where this is present, the anti-SPX service may obtain the image that is transmitted in connection with the call setup (316) and perform face recognition or other forms of image recognition on the image to determine whether the image provides an indication that the call is SPX. For example, where the image is of a known SPX generator, doesn't contain an image of a person, or otherwise indicates that the call is less likely to be a legitimate video telephony call, the anti-SPX service may use this result in connection with determining if the call is likely to be SPX.

Once all of the available information has been gathered, the anti-SPX service will weight the information individually or in one or more combinations to determine whether the call is likely to be SPX (320). Specifically, the anti-SPX service will weight the result of signaling information processing or the lack of signaling information, the result of the voice recognition and optionally content recognition from the voice sample, the result of the voice type processing, an indication of a lack of voice sample, and any result of the image recognition processes, to provide a SPX score. The SPX score may then be used to selectively connect the call to the destination 14 or to route the call to another location such as to multimedia mailbox server 20.

If the determination by the anti-SPX server is that the call should be connected, the call will be passed to the destination 14 to be handled in a conventional fashion. For example, the call may be routed to the intended recipient so that the phone associated with the called party may ring, vibrate, or otherwise notify the called party that a call is being received. If the called party declines to answer the call or if the called party is already on another call (322), the call may be transferred to multimedia mailbox (324) so that the calling party may leave a message on the multimedia mailbox server. The message in this instance may be stored in a safe folder so that the called party may quickly retrieve that message at a later time without requiring the called party to sort through a plurality of junk messages. Optionally, the message may be analyzed as described below and as shown by the dashed line in FIG. 3.

If the anti-SPX service determines that the call is likely to be SPX, it may cause the call to be sent to the multimedia mailbox server so that the content of the call may be analyzed. By sending the call directly to the multimedia mailbox server, the destination will not be notified of the incoming call and, hence, will not be notified every time a SPIT call arrives. Alternatively, the call may be routed to an anti-SPIT processing center such as an answering center and connected to a live person who will screen the call.

When a call is sent to the multimedia mailbox server, the multimedia mailbox server may cause the content of the SPX to be analyzed (326) to determine whether the SPX should be stored in a safe folder or a SPIT folder. The multimedia mailbox server may perform this process alone or in connection with the anti-SPX service. Optionally, the anti-SPX service may perform this processing itself by causing the content of the message to be transferred back to the anti-SPX system once delivery of the message has been completed, or by causing a copy of the message to be stored in a temporary storage area while it is being delivered to the multimedia mailbox server 20.

As shown in FIG. 3, the content of a message may be analyzed (326) to determine if it is SPX. For example, voice recognition, voice type analysis, and content analysis may be performed on the message to determine whether the message was likely generated as a result of SPX. The processes of determining the voice recognition, voice type, and content may be performed in the manner described above in connection with analyzing the voice sample.

Other processes may also be used to determine if the message is SPX. For example, the content of the message may be compared to other stored messages (328). Where the message is identical to other messages or sufficiently similar to other messages, it may be determined to be more likely to be SPX.

Once the content is analyzed, the anti-SPX server may weight the factors associated with a particular message, such as by counting the number of keywords matched in a particular message, weighting the particular key words, determining the type of voice, the identity of the person sending the message as determined by the voice-recognition process, and other factors, and then generate a score as to whether the message is likely to be SPX (330). Where the weighting process indicates that the likelihood is below a particular threshold, the message may be stored in a safe folder for the user (332). If, however, it is determined that it is more likely that this message is SPIT, the message may be place in a special folder designated as containing messages that are likely to be SPIT (334). The use of two folders may allow an user to prioritize reviewing messages deemed more likely to be legitimate so that the user is not constantly required to listen to SPIT messages intermixed with legitimate messages.

Regardless of whether the call is directly connected, directly sent to the user's safe folder in e-mail, analyzed and then sent to the safe folder, or analyzed and sent to a SPIT folder, the user may be provided with an opportunity to provide feedback as to whether the call was legitimate or SPIT (338). The use of this feedback may help the anti-SPX service fine-tune the system so that it is able to identify SPX more accurately in connection with future voice and video calls. Similarly, where a message is identified as SPX, the user may provide feedback to indicate to the anti-SPX server that this message is not SPX and that, optionally, the caller should be added to the white list so that future communications from this caller are allowed to be transmitted through to the destination or other associated destinations.

Figure 4:
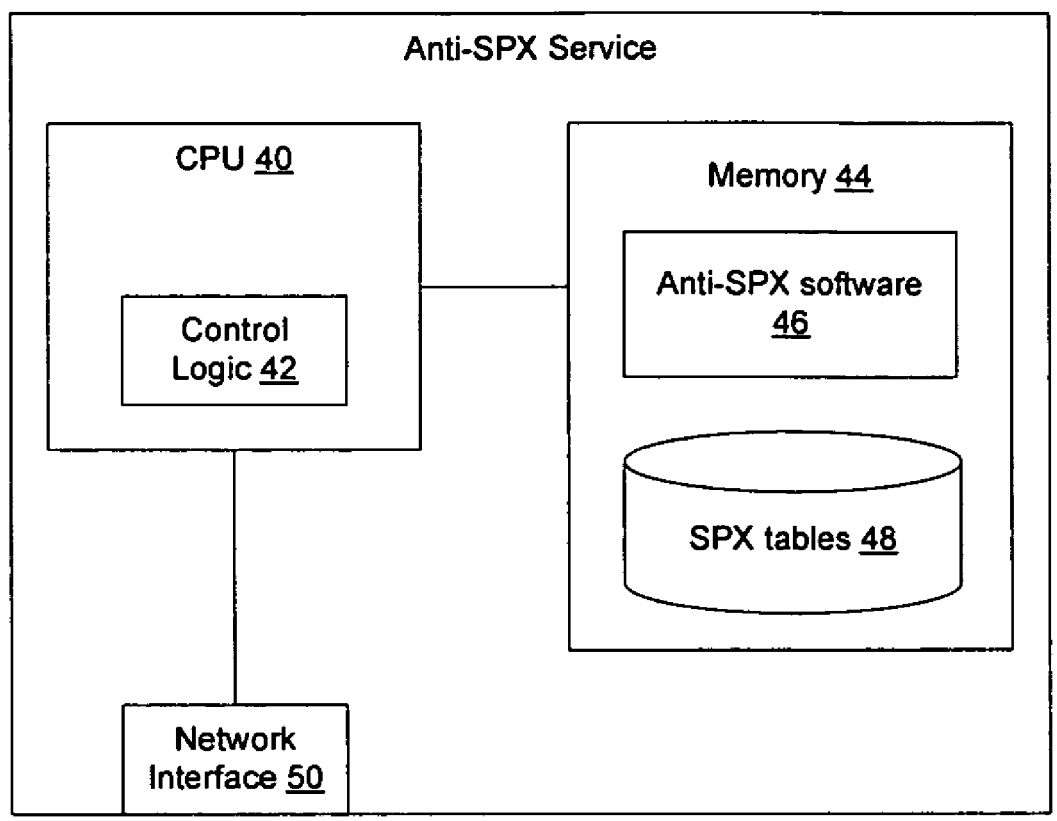
FIG. 4 is a functional block diagram of a computer platform configured to implement an anti-SPX service according to an embodiment of the invention.

FIG. 4 shows an embodiment of an anti-SPX service implemented on a computer platform. The computer platform may be part of a network element, a gateway, a signaling server, a multimedia mailbox server, a general purpose computer, or a computer platform implemented to perform other functions on the network.

In the embodiment shown in FIG. 4, the computer platform includes a processor 40 containing control logic 42 configured to implement the functions associated with the anti-SPX service described herein. The computer platform may also include a memory 44 configured to store anti-SPX software 46 and a database of SPX tables 48 containing data for use by the anti-SPX software 46 to enable messages to be scored. For example, the SPX tables 48 may include the white and black lists, voice signatures, and other information described above that may enable the anti-SPX service to score communications. The control logic 42 may selectively retrieve data and instructions from the memory to enable the processor to implement the functions associated with the anti-SPX service described herein and encoded into the anti-SPX software 46.

The computer platform may include many other components to enable it to operate in a conventional manner to perform general computer processing operations. For example, the computer platform may include a network interface 50 configured to enable messages to be received by the computer platform for processing in connection with the anti-SPX service described herein.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of determining an identity of an entity placing a telephone call by an anti-SPX service to detect whether an unsolicited telephone call is a Spam Over Internet Telephony (SPIT) telephone call, the method comprising the steps of:

analyzing, by the anti-SPX service, signaling information associated with the telephone call;

obtaining, by the anti-SPX service, a voice sample associated with the entity placing the telephone call;

performing, by the anti-SPX service, a voice recognition process on the voice sample to obtain a voice signature associated with the entity placing the telephone call;

comparing, by the anti-SPX service, the voice signature against voice signatures of entities known to place SPIT be telephone calls; and determining, by the anti-SPX service, if the telephone call is likely to be a SPIT telephone call from the result of analyzing the signaling information and the result of the voice signature comparison.

2. The method of claim 1, further comprising the step of performing a voice type recognition process by the anti-SPX service.

3. The method of claim 2, wherein the voice type recognition process is configured to determine if the voice sample is associated with a live person, a prerecorded voice, or a machine generated voice; and wherein the step of determining if the telephone call is likely to be a SPIT telephone call further comprises using the result of the voice type recognition process.

4. The method of claim 1, further comprising identifying a person associated with the voice from the voice signature; and wherein the step of determining if the telephone call is likely to be a SPIT telephone call further comprises comparing the identity of the person to determine whether the person is a known source of SPX.

5. The method of claim 1, wherein the voice sample is obtained in response to a question, the method further comprising the step of analyzing, by the anti-SPX service, a content of the voice sample; and wherein the step of determining if the telephone call is likely to be a SPIT telephone call further comprises comparing the analyzed content with expected content.

6. The method of claim 1, wherein the telephone call is a video telephone call, the method further comprising the step of obtaining, by the anti-SPX service, a video image associated with the video telephone call.

7. The method of claim 6, further comprising the step of analyzing, by the anti-SPX service, the video image to obtain a caller identification from the video image; and wherein the step of determining if the telephone call is likely to be a SPIT telephone call further comprises comparing video image with video images of people who are known sources of SPX.

8. The method of claim 1, further comprising scoring, by the anti-SPX service, the telephone call, the score being associated with a likelihood that the telephone call is SPIT.

9. The method of claim 1, wherein the step of analyzing the signaling information associated with the telephone call comprises detecting whether the call is part of a conference call; the method further comprising the step of detecting whether media associated with the telephone call is being transmitted to multiple destinations simultaneously; and wherein if the media is being transmitted to multiple destinations simultaneously and the signaling indicates that the call is not part of a conference call, the method further comprising the step of determining that the call is likely to be SPIT.

10. The method of claim 1, further comprising the step of detecting, by the anti-SPX service, whether media content associated with the telephone call has been previously transmitted to another destination; and wherein the step of determining if the telephone call is likely to be a SPIT telephone call further comprises using the result of the detecting to increase the likelihood that a telephone call is SPIT if the content has previously been transmitted to other destinations.

* * * * *